United States Patent [19]
Choi

[11] Patent Number: 5,646,929
[45] Date of Patent: Jul. 8, 1997

[54] OPTICAL PICKUP DEVICE

[75] Inventor: Yang-Oh Choi, Seoul, Rep. of Korea

[73] Assignee: Daewoo Electronics Co., Ltd., Seoul, Rep. of Korea

[21] Appl. No.: 528,644

[22] Filed: Sep. 7, 1995

[30] Foreign Application Priority Data

Oct. 26, 1994 [KR] Rep. of Korea .................. 94-27372

[51] Int. Cl.$^6$ ............................................. G11B 7/135
[52] U.S. Cl. .................. 369/112; 369/44.12; 369/44.37
[58] Field of Search .................................. 369/112, 110, 369/111, 109, 100, 103, 93, 94, 44.37, 44.38, 44.14, 44.12

[56] References Cited

U.S. PATENT DOCUMENTS 4,905,214  2/1990  Nagashima .......................... 369/112 X
5,408,453  4/1995  Holtslag et al. .................... 369/94 X Primary Examiner—Muhammad N. Edun
Attorney, Agent, or Firm—Beveridge, DeGrandi, Weilacher & Young

[57] ABSTRACT

An optical pickup device for recording/reproducing an optical disc having at least two data storing layers on one side thereof generates laser beams having different wavelengths from two laser beam sources. The laser beams are incident to a cubic prism in the form of combining four triangular bar prisms for selectively transmitting or reflecting respective laser beams through or from respective combining planes according to the wavelengths. The incident beam is curved by the cubic prism at the right angle to be incident to the optical disc, and then incident to the cubic prism by which the beam is cut by half to be received into a two division photodetector, thereby controlling focusing and tracking of the laser beams.

8 Claims, 4 Drawing Sheets

OPTICAL PICKUP DEVICE

BACKGROUND OF THE INVENTION

1. Field of the Invention

The present invention relates to an optical pickup device, and more particularly to an optical pickup device capable of easily realizing recording/reproducing of an optical disc having at least two recording layers on one side thereof.

2. Description of the Prior Art

Information reproducing/recording systems for using optical discs such as laser discs or compact discs have been developed in recent days. Higher data densities are desirable for a variety of reasons, including the ability to make compact discs smaller and to enable the recording of High Definition Television (HDTV) compatible video discs.

One method considered possible for achieving a high data density in an optical data medium was to focus the read laser to an even finer beam diameter, but the maximum practical limit to the numerical aperture (NA) of an objective lens which focuses the laser is approximately 0.6. It would also be possible to obtain a similar result by shortening the laser wavelength, but a wavelength of a practical semiconductor laser is limited for the present.

A second method for achieving a high density is to use V-grooves in the optical disc, such as disclosed in U.S. Pat. No. 4,569,038 issued to Nagashima et al. (Feb. 4, 1986).

The capacity of the data recordable on an optical disc using conventional technologies is determinable. For an optical disk housed in a 3.5 inch cassette case, the disc diameter is approximately 86 mm, providing a data storage area with a radius of 25 mm to 41 mm. It is assumed that a 670 nm wavelength laser is used with a 0.55 NA objective lens. With a 0.8 m track pitch (1.6 μm V-groove pitch) and 0.47 μm bit length, the unformatted single-side capacity is 1.1 Gbytes. Using the standard CD format, a single-side formatted capacity of 550 Mb, the same as a 12 μcm CD, can be obtained.

If information conventionally provided as printed material is to be provided in the future on a CD-ROM or other optical data medium, it will also be necessary and convenient if the user is able to write to the medium to record notes as is done currently with paper media, instead of only being able to read the information. One method which makes this possible divides the disc into a read/writable areas, wherein a recording film is formed on the inside portion of the disc, and a read-only data area comprising a reflective metal film on the outside portion of the disc. However, this method reduces the read-only data area, and therefore limits the amount of information distributable on a single disc.

As thus described, while smaller, higher capacity optical data media, including optical discs and cards, are desirable. To satisfy this requirements, an optical medium having two data storing layers has been developed, and such an optical pickup device is disclosed in U.S. Pat. No. 5,134,604 issued to Nagashima et al.

A conventional optical pickup device will be described in detail with reference to FIG. 1 below.

FIG. 1 is a schematic view of the conventional optical pickup device. A light source 10 is a laser diode for generating a laser beam for recording/reproducing information on/from an optical disc D. The laser beam from laser diode 10 is converted into parallel rays through a collimator lens 11. The beams converted into the parallel rays by collimator lens 11 sequentially pass through a beam splitter 12, an objective lens 14 and a transparent substrate 16 to be incident to the surface of optical disc D with a beam spot of approximately 1 μm diameter.

Here, beam splitter 12 is provided in such a manner that two right-angled prisms are installed to oppose to each other along respective inclination planes of 45°, and a coating layer 13 is formed along the contacting portion of the prisms, thereby securing the property of travelling straight of the incident beam while transmitting some of the incident beam and reflecting the other incident beam at a right angle with respect to the incident beam.

The laser beam being straightly transmitted through beam splitter 12 passes through transparent substrate 16 which is removably arranged between objective lens 14 and optical disc D. The focal distance of the laser beam can be arbitrarily controlled in accordance with the arranged position, refractive index and thickness of transparent substrate 16. Therefore, the position, refractive index and thickness of transparent substrate 16 are properly determined to focus the beam from laser beam source 10 on a nearer data recording plane of optical disc D under the state of eliminating transparent substrate 16, and allow the laser beam to pass through transparent substrate 16 of a predetermined thickness prior to focusing on a farther data recording plane of optical disc D under the state of inserting transparent substrate 16 of the predetermined thickness.

The laser beam reflected at the right angle while passing through beam splitter 12 focuses while passing through a focusing lens installed along an optical path of the reflected light, and the light focused by focusing lens 15 is received into a four or six division light-receiving diode 17. Using an image formed by the beam received into light-receiving diode 17, a positional accuracy, i.e., focusing error and tracking error, of the optical pickup device with respect to optical disc D is detected.

By this operation, the focusing and tracking are controllable along with reproducing the information on the basis of the amount of the reflected lights determined by pits of optical disc D.

According to the conventional optical pickup device constructed as above, however, a lot of equipments including a transferring apparatus of the transparent substrate and several sensors are required for inserting and eliminating the transparent substrate. Additionally, a working distance of the objective lens is shortened to make the control of the focusing and tracking a demanding job, thereby degrading quality of the pickup. Furthermore, it involves a technical difficulty since a tolerance below 0.1° should be controlled to insert the transparent substrate.

SUMMARY OF THE INVENTION

It is an object of the present invention to provide an optical pickup device capable of easily realizing recording/ reproducing information on/from an optical disc having at least two data storing layers on one side thereof to more accurately control focusing and tracking.

It is another object of the present invention to provide a more simplified and minimized optical pickup device capable of easily realizing recording/reproducing information on/from an optical disc having at least two data storing layers on one side thereof.

In order to achieve the above-mentioned object, an optical pickup device according to the present invention comprises first and second laser beam sources for generating first and second laser beams having different wavelengths from each other for recording/reproducing information on/from an optical disc, beam splitter means arranged along an optical path of the beams from the first and second laser beam sources for selectively transmitting or reflecting the first and second laser beams based upon the positions of the beams to focus the laser beams on the optical disc, and selectively focusing the beams reflected from the optical disc onto light-receiving means, an objective lens for focusing the laser beams onto the optical disc when the first and second laser beams proceed toward the optical disc via the splitter means, and a light-receiving means for receiving the laser beams reflected from the optical disc to control a focusing and a tracking of the laser beams, whereby the two laser beams having the different wavelengths from each other separately record/reproduce corresponding two data storing layers during recording/reproducing information of the optical disc having the stacked two data storing layers on one side thereof.

Preferably, the beam splitter means is a cubic prism having a first axis, a second axis and a third axis respectively piercing through respective centers of optional two facing planes of the cube, the first axis being arranged to intersect the optical disc at the right angle at the center of the optical disc, the second axis along which the first and second laser beam sources are arranged to oppose to each other by interposing the beam splitter means, and, under the state that the cubic prism is divided into four triangular bar-shaped prisms by two symmetrical diagonal planes perpendicular to a plane formed by the first and second axes to be formed of a first triangular bar prism toward the first laser beam source, a second triangular bar prism toward the second laser beam source, a third triangular bar prism toward the optical disc and a fourth triangular bar prism symmetrical to the third prism, a contacting plane of the first and fourth prisms is designated as a first reflection plane, a contacting plane of the second and third prisms is a second reflection plane, a contacting plane of the third and first prisms is a third reflection plane and a contacting plane of the fourth and second prisms is a fourth reflection plane, wherein the reflection planes are coated in such a manner that the first reflection plane partially reflects and partially transmits the first laser beam while total transmitting the second laser beam, the second reflection plane total reflects the first laser beam and total transmits the second laser beam, the third reflection plane total transmits the first laser beam and total reflects the second laser beam, and fourth reflection plane total transmits the first laser beam while partially reflecting and partially transmitting the second laser beam, whereby the information on the optical disc is recorded/reproduced by the first and second laser beams having the different wavelengths emitted from the first and second laser beam sources and the focusing and tracking control is carried out by the light-receiving means.

To control the focusing and tracking, preferably, a beam section is cut by half by a beam splitting unit when first and second laser beams are incident to a light-receiving unit which is a photodetector for receiving the laser beams.

The optical disc having the two data storing layers is formed of, sequentially from the bottom side to which the first or second laser beam is incident, a first resin layer of which upper portion functions as a first recording layer, a thin film layer for total reflecting either one of the two laser beams having one wavelength while total transmitting the other laser beam having the other wavelength, a second resin layer of which upper portion functions as the second recording layer and a reflection layer for reflecting the laser beam of the other wavelength.

As described above, the optical pickup device according to the present invention is provided with the first and second laser beam sources and the beam splitting unit formed of four triangular prisms having respective contacting planes to selectively transmit or reflect in accordance with the wavelengths of laser beams. By using such an optical pickup device, two laser beams having the wavelength different from each other are used to separately record/reproduce the two data storing layers during recording/reproducing information of the optical disc having at least two data storing layer on one side thereof. Additionally, the shape of the beam spot received into the photodetector differs in accordance with the type of the laser beams to sufficiently control the focusing and tracking with respect to the laser beams.

Furthermore, in the optical pickup device according to the present invention, the optical disc having the two data storing layers on one side thereof can be reproduced by means of the single beam splitting unit. Also, the beam splitting unit is shaped as a cube to simply and easily control the arrangement and position adjustment of the element. Moreover, the beam splitting unit is constructed to simultaneously perform the function of a knife-edge added to a conventional beam splitting unit, so that the number of elements is significantly reduced as compared with that of the conventional optical pickup device.

BRIEF DESCRIPTION OF THE DRAWINGS

The above objects and other advantages of the present invention will become more apparent by describing in detail preferred embodiments thereof with reference to the attached drawings in which.

DESCRIPTION OF THE PREFERRED EMBODIMENT

An optical pickup device according to the present invention will be described in detail below.

Figure 1:
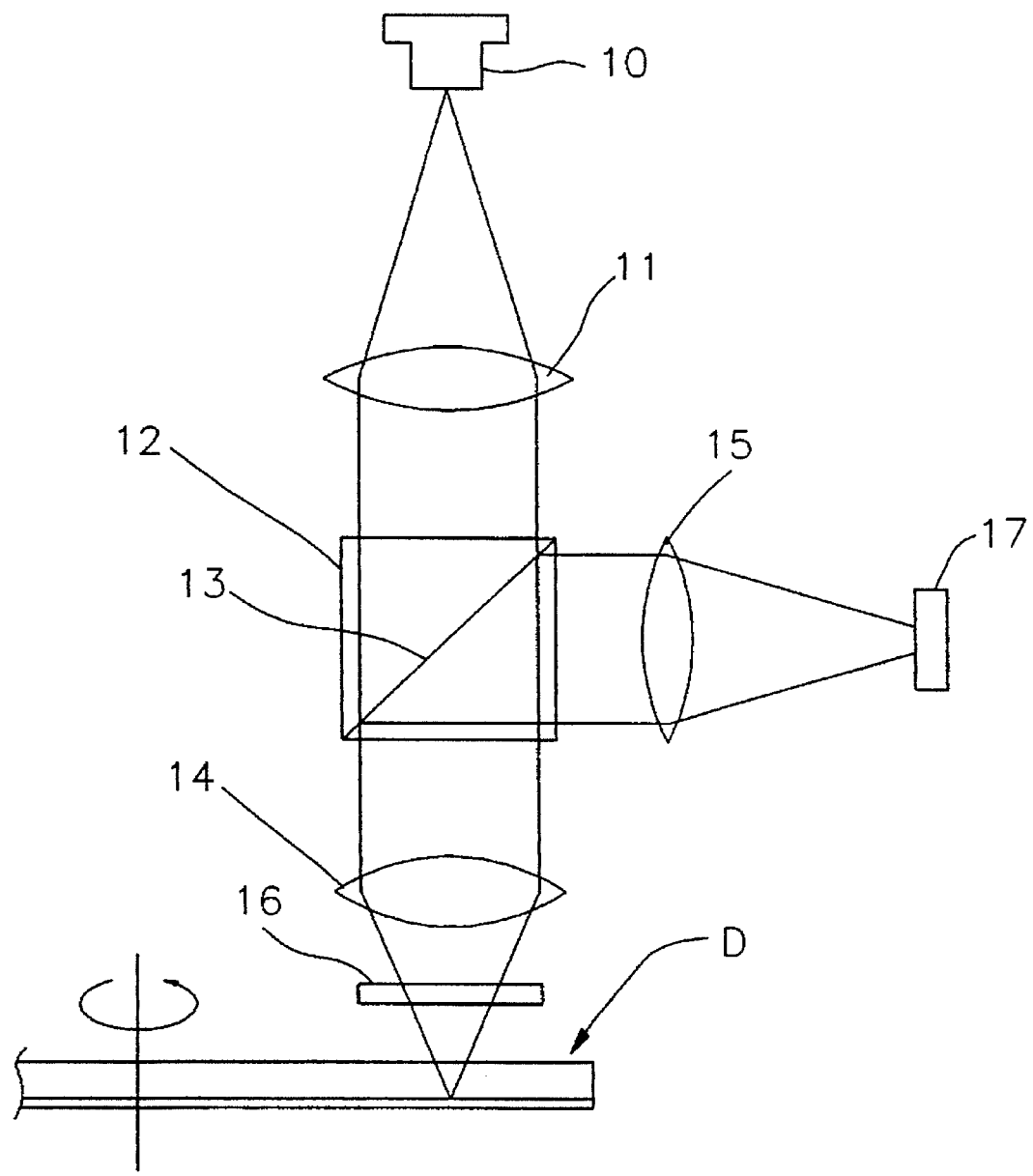
FIG. 1 is a schematic view showing a conventional optical pickup device.
Figure 2:
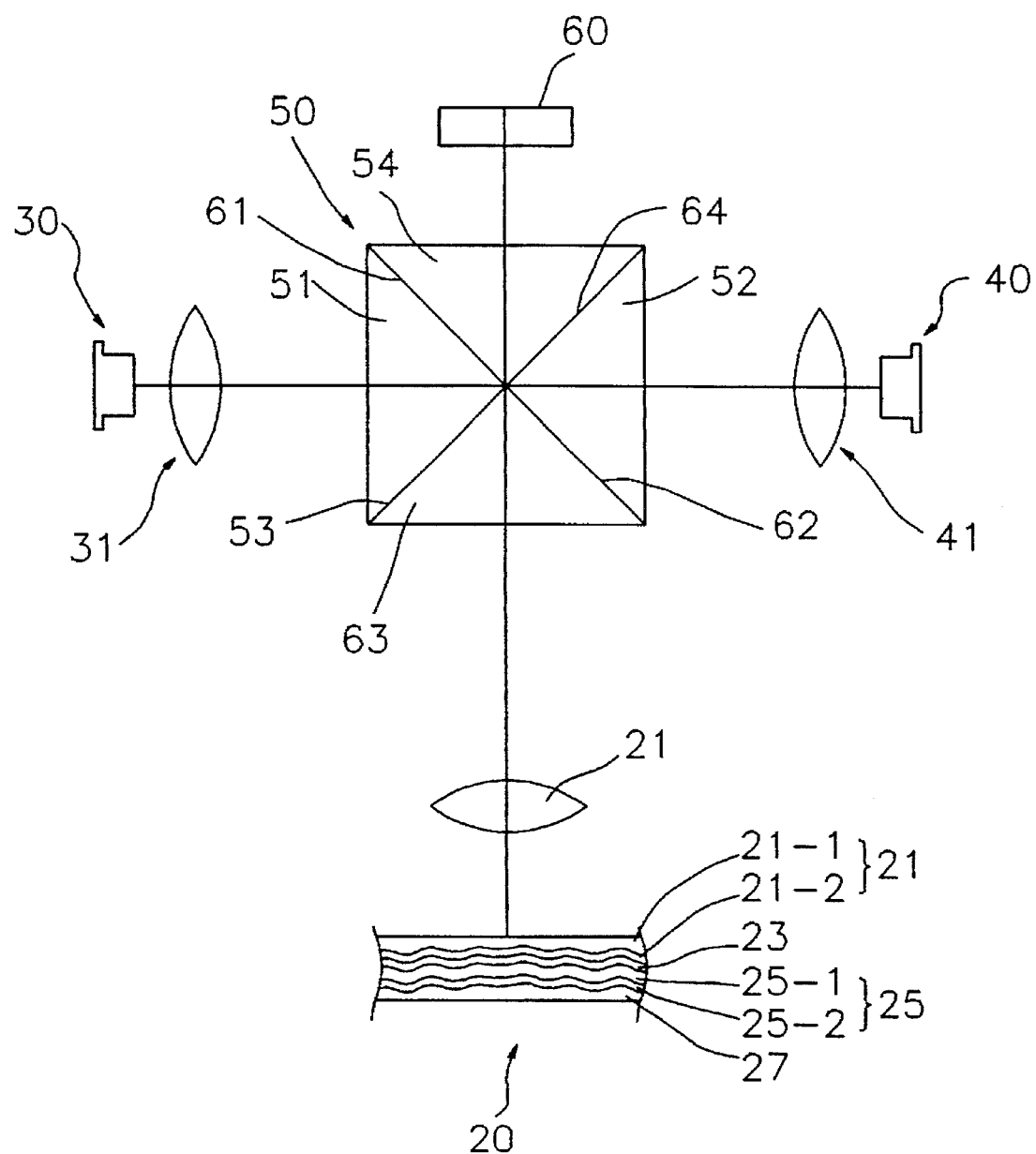
FIG. 2 is a schematic view showing an optical pickup device according to one embodiment of the present invention.

FIG. 2 is a schematic view showing the optical pickup device provided with first and second laser beam sources and a cubic prism according to one embodiment of the present invention.

A reference numeral 20 denotes an optical disc having a two data storing layers on one side thereof to enable recording or reproducing information. Reference numerals 30 and 40 denote laser beam sources which are first and second laser diodes for emitting first and second laser beams having different wavelength of $\lambda 1$ and $\lambda 2$ to read out information of two storing layers on optical disc 20.

Cubic prism 50 is arranged between first and second laser diodes 30 and 40 as a beam splitter unit to force the first and second laser beams from first and second laser diodes 30 and 40 to proceed toward optical disc 20.

In order to permit the first and second laser beams from first and second laser diodes 30 and 40 to be incident to cubic prism 50 in the form of parallel rays, respectively, first and second collimator lenses 31 and 41 are respectively installed between first laser diode 30 and cubic prism 50 or second laser diode 40 and cubic prism 50.

Cubic prism 50 is formed by lengthwisely adhering first, second, third and fourth prisms 51, 52, 53 and 54 in the shape of a triangular bar. Here, first and second prisms 51 and 52 shaped as triangular bars are symmetrical to each other, and third and fourth prisms 53 and 54 shaped as triangular bars are symmetrical to each other, thereby constituting the cube. It is assumed that an axis piercing through a point of optical disc 20 to be reproduced while intersecting the plane of optical disc 20 at the right angle is defined as a first axis, and an axis, among three axes of piercing respective centers of optional two facing planes of the cube, piercing through third and fourth triangular prisms 53 and 54 being symmetrical to each other is arranged to concur with the first axis. In other words, it is arranged to allow the extension line of the piercing axis to intersect optical disc 20 at the right angle and at the point of reproducing optical disc 20.

Meantime, an axis, among the three axes of piercing the respective centers of optional two facing planes of the cube, piercing through first and second triangular prisms 51 and 52 being symmetrical to each other is defined as a second axis. Along the extension line of the second axis, first and second laser diodes 30 and 40 are arranged where they oppose to each other by interposing cubic prism 50. By this arrangement, cubic prism 50 is divided into four triangular prisms 51, 52, 53 and 54 by symmetrical two diagonal planes which form the right angle to the plane formed by first and second axes. In more detail, they are divided into first triangular prism 51 toward first laser beam source 30, second triangular prism 52 toward second laser beam source 40, third triangular prism 53 toward optical disc 20 and fourth triangular prism 54 symmetrical to third prism 53. Here, in order to record/reproduce information on/from optical disc 20 by means of the first and second laser beams having different wavelengths λ1 and λ2 emitted from first and second laser diodes 30 and 40, it is designated that the contacting plane of first and fourth prism 51 and 54 is a first reflection plane 61, that of second and third prism 52 and 53 is a second reflection plane 62, that of third and first prisms 53 and 51 is third reflection plane 63, and that of fourth and second prisms 54 and 52 is a fourth reflection plane 64. At this time, reflection planes 61, 62, 63 and 64 are coated to serve as follows. First reflection plane 61 partially reflects and partially transmits the first laser beam having the wavelength of λ1 while total transmitting the second laser beam having the wavelength of λ2. Second reflection plane 62 total reflects the first laser beam while total transmitting the second laser beam. Third reflection plane 63 total transmits the first laser beam while total reflecting the second laser beam. Fourth reflection plane 64 total transmits the first laser beam while partially reflecting and partially transmitting the second laser beam. By doing so, the first and second laser beams from first and second laser diodes 30 and 40 advance toward optical disc 20 by means of cubic prism 50.

The first and second laser beams incident to and reflected from optical disc 20 are selectively transmitted through or reflected by first, second, third and fourth reflection planes 61, 62, 63 and 64 while passing through cubic prism 50 to focus onto a photodetector 60 under the condition that a half of the beam section is cut. A photodetector 60 divided by two is installed to receive the beam of which section is cut by half.

On the other hand, when the first or second laser beam is incident from the lower side of optical disc 20, optical disc 20 having the two data storing layers is formed of sequentially provided four layers as below. That is, from the bottom side, a first transparent layer 21 consists of a first layer 21-1 and a first recording layer 21-2 thereon, and a thin film layer 23 selectively reflects only the laser beam of either wavelength (e.g., λ1) between the first and second laser beams, and total transmits the laser beam of the other wavelength (e.g., λ2). Successive to this, a second transparent layer 25 consists of a second layer 25-1 contacting the upper portion of the thin film layer and a second recording layer 25-2 thereon, and a reflection layer 27 is formed for reflecting the laser beam having the other wavelength of λ2. In this case, a medium material is determined such that the first recording layer of the first transparent layer selectively affects the laser beam of the wavelength of λ1 not to affect the laser beam of the wavelength λ2.

Figure 3:
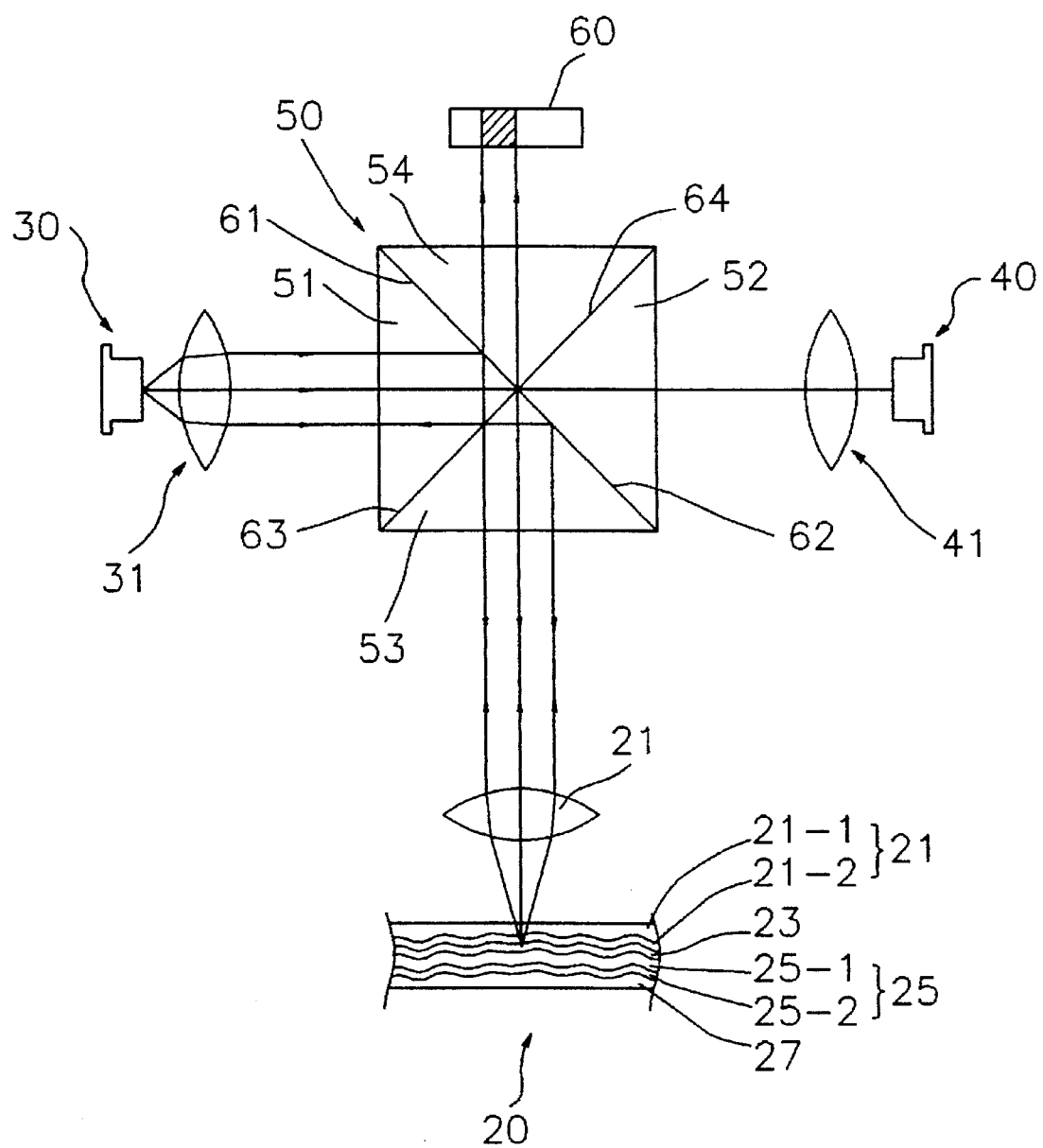
FIG. 3 is a view illustrating an optical path of the laser beam from the first laser beam source in the optical pickup device of FIG. 2.

Hereinbelow, the operation of the optical pickup device according to the present invention constructed as above will be described with reference to FIGS. 3 and 4. FIG. 3 is a view illustrating an optical path of the laser beam from the first laser beam source of the optical pickup device shown in FIG. 2.

To begin with, the first laser beam having the wavelength of λ1 is emitted from first laser diode 30 on the second axis.

The laser beam is converted into the parallel rays in parallel to the second axis while passing through collimator lens 31.

The parallel rays are vertically incident onto first triangular prism 51 of cubic prism 50. The incident beam straightly advances through first triangular prism 51. In the beam, some of the light reaching first reflection plane 61 is reflected by first reflection plane 61 to be curved by 90 V, thereby proceeding to optical disc 20, and the other transmits therethrough to thereby total transmit fourth reflection plane 64. Meantime, in the beam straightly advancing through first triangular prism 51, the light reaching third reflection plane 63 total transmits to straightly advance. The straightly-advancing beam is total reflected from second reflection plane 62 of third triangular prism 53 to be curved by 90 V, thereby proceeding to optical disc 20 on the first axis.

The beam (having the wavelength of λ1) toward optical disc 20 is incident to focus onto optical disc 20, more specifically onto the first transparent layer of optical disc 20, by means of objective lens 21, and is then reflected by the thin film layer which selectively and total reflects the laser beams of the wavelength of λ1. Thereafter the reflected beam again passes through objective lens 21 to regress to cubic prism.

The regressing beam is again incident into third triangular bar 53 of the cube to straightly advance. In the beam, the light reaching third reflection plane 63 is total transmitted to straightly advance. The straightly-advancing beam partially transmits through first reflection plane 61 under the straightly advancing state to be received into photodetector 60, and partially reflected. On the other hand, in the beams incident into third triangular prism 53, the light reaching second reflection plane 62 is total reflected to be curved by 90° within the cube not to focus onto photodetector 60.

Thus, if the first laser beam having the wavelength of λ1 is generated from first laser beam source 30, only the beam reflected from optical disc 20 focus onto two division photodetector 60 under the condition that the right-side half of the beam is cut to enable the read-out information of data on the first data recording layer of optical disc 20 and the controlling of the tracking and focusing with respect to the first data recording layer.

Here, the beam transmitted through first reflection plane 61 total transmits through fourth reflection plane 64 not to affect photodetector 60. Also, third reflection plane 63 total transmits the laser beam having the wavelength of λ1, which thereby does not affect the recording/reproducing of the data or tracking/focusing control by reflecting the beam to photodetector 60. As shown in FIG. 3, the beam is focused under the condition that the right-side half of the beam is cut by second reflection plane 62, so that the tracking and focusing can be controlled based upon the size and shape of the focused beam spot.

Figure 4:
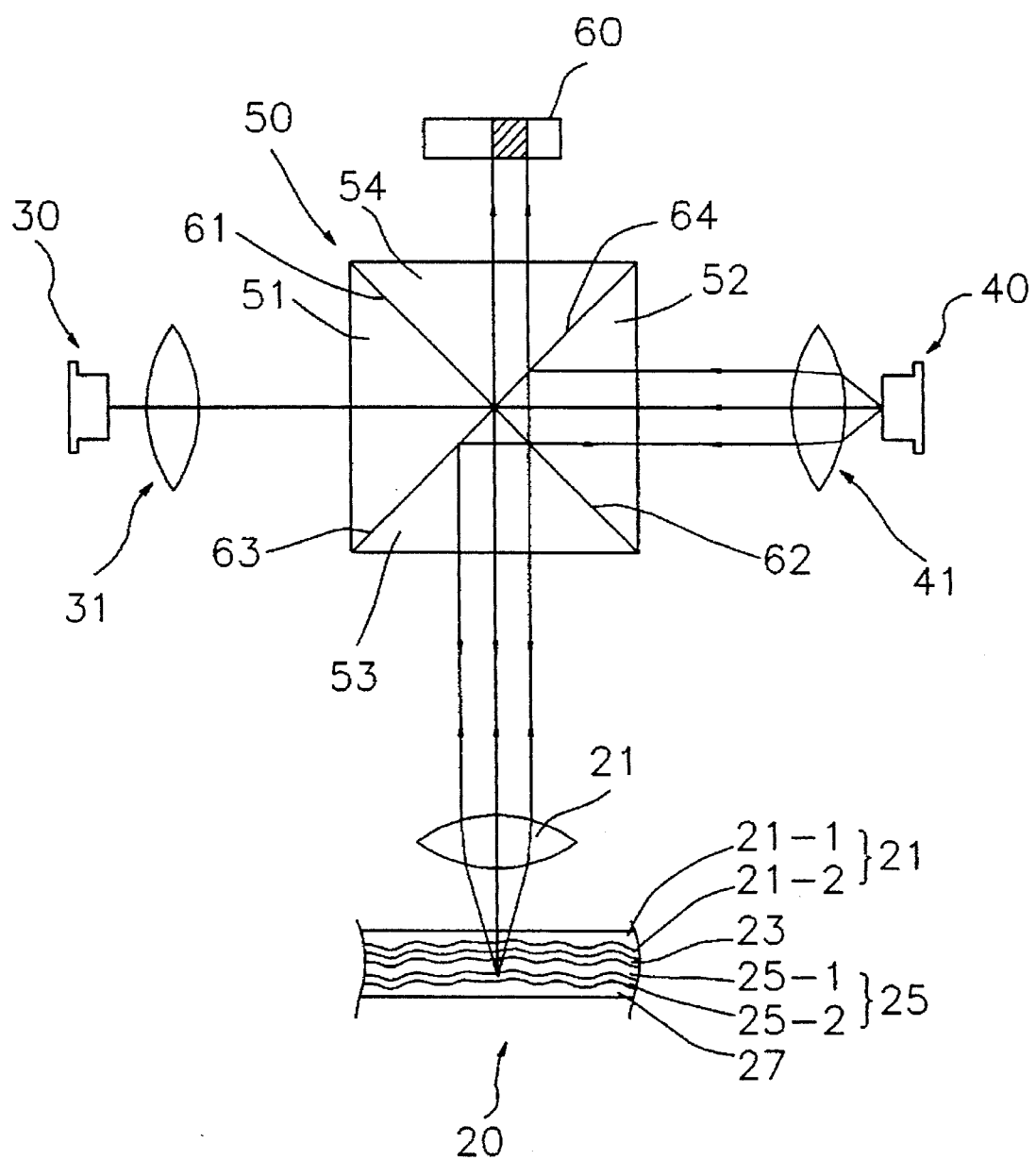
FIG. 4 is a view illustrating an optical path of the laser beam from the second laser beam source in the optical pickup device of FIG. 2.

FIG. 4 illustrates the optical path of the laser beam emitted from the second laser beam source of the optical pickup device shown in FIG. 2. Then, the second laser beam having the wavelength of λ2 is emitted from second laser diode 40 opposingly facing to first laser diode 30 along the second axis, using cubic prism 50 as a reference. The laser beam is converted into the parallel rays in parallel to the second axis when passing through collimator lens 32.

The parallel rays are vertically incident to second triangular prism 52 of cubic prism 50. The incident beam straightly advances through second triangular prism 52. In the resulting beam, some of the light reaching fourth reflection plane 64 is reflected by fourth reflection plane 64 to be curved by 90° to proceed optical disc 20, and other light transmits therethrough to total transmit first reflection plane 61. On the other hand, in the beam straightly-advancing through second triangular prism 52, the light reaching second reflection plane 62 total transmits to straightly proceed. The straightly-advancing beam is total reflected by third reflection plane 63 of third triangular prism 53 to be curved by 90° to proceed toward optical disc 20 on the first axis.

The beam (having the wavelength of λ2) proceeding toward optical disc 20 is incident to optical disc 20 while focusing thereon by means of objective lens 21 as is the first laser beam. More specifically, the beam transmits the first transparent layer (which does not response to the laser beam having the wavelength of λ2) of optical disc 20 intact, and is reflected by the reflection layer on the upper portion of the second transparent layer. The reflected beam again passes through objective lens 21 to regress to cubic prism 50.

The regressing beam is again incident into third triangular prism 53 of the cube to straightly advance. In the resulting beam, the light reaching second reflection plane 62 total is transmitted to straightly proceed. Some of the straightly-advancing beam is transmitted under the straight advancing state to be received into photodetector 60, and the other beam is reflected. Meantime, the light reaching third reflection plane 63 in the beam incident to third triangular prism 53 is total reflected to be curved by 90 V within the cube prior to advancing. As the result, the beam is not focused onto photodetector 60.

Accordingly, when the second laser beam having the wavelength of λ2 is generated from second laser beam source 40, only the beam reflected from optical disc 20 focuses onto two division photodetector 60 under the condition that the left-side half of the beam is cut, so that the information of the data on the second data recording layer of optical disc 20 can be read out and the tracking and focusing with respect to the second data recording layer are controllable.

At this time, the beam transmitted through fourth reflection plane 64 total transmits first reflection plane 61 without being reflected not to affect photodetector 60. Also, second reflection plane 62 is the full transmitting plane of the laser beam having the wavelength of λ2, which thus does not affect the recording/reproducing of the data or the tracking/focusing control by being reflected to photodetector 60. By third reflection plane 63 as shown in FIG. 3, the beam is focused while the left-side half of the beams is cut as shown in FIG. 4. Thus, the tracking and focusing can be controlled based upon the size and shape of the focused beam spot.

The optical pickup device according to the present invention is provided with first and second laser beam sources and a beam splitting unit formed of four triangular prisms having respective contacting planes to selectively transmit or reflect in accordance with the wavelengths of laser beams. By using such an optical pickup device, two laser beams having the wavelength different from each other are used to separately record/reproduce the two data storing layers during recording/reproducing information of an optical disc having at least two data storing layers stacked on one side thereof. Additionally, the shape of the beam spot received into a photodetector differs in accordance with the type of the laser beams to sufficiently control the focusing and tracking with respect to the laser beams.

Furthermore, the optical disc having the two data storing layers on one side thereof can be reproduced by means of a single beam splitting unit. Also, the beam splitting unit is shaped as a cube to simply and easily control the arrangement and position adjustment of the element.

Moreover, the beam splitting unit is constructed to simultaneously perform the function of a knife-edge added to a conventional beam splitting unit, so that the number of elements is significantly reduced as compared with that of the conventional optical pickup device. As a result, the arrangement and position adjustment of respective elements can be simply and easily controlled, and fabrication cost thereof can be economized while minimizing overall size of the optical pickup device.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical pickup device comprising:
   first and second laser beam sources for generating first and second laser beams having different wavelengths from each other for recording/reproducing information on/from an optical disc;
   beam splitter means arranged along an optical path of said beams from said first and second laser beam sources for selectively transmitting or reflecting said first and second laser beams based upon the positions of said beams to focus said laser beams on said optical disc, and selectively focusing said beams reflected from said optical disc onto light-receiving means, said beam splitter means being a cubic prism having a first axis, a second axis and a third axis respectively piercing through respective centers of optional two facing planes of the cube, said first axis being arranged to intersect said optical disc at the right angle at the center of said optical disc, said second axis along which said first and second laser beam sources are arranged to oppose each other by interposing said beam splitter means; and, under the state that said cubic prism is divided into four triangular bar-shaped prisms by two symmetrical diagonal planes perpendicular to a plane formed by said first and second axes to be formed of a first triangular bar prism toward said first laser beam source, a second triangular bar prism toward said second laser beam source, a third triangular bar prism toward said optical disc and a fourth triangular bar prism symmetrical to said third prism, a contacting plane of said first and fourth prisms is formed of a first coating layer, a contacting plane of said second and third prisms is a second coating layer, a contacting plane of said third and first prisms is a third coating layer and a contacting plane of said fourth and second prisms is a fourth coating layer, wherein the coating layers are formed to be totally transmitted, partially transmitted or totally reflected that the first and second laser beams are focused in a state that a half section of the beams are cut through the coating layers, so that tracking and focusing servos can be carried out based upon conditions of the focused half beam spot;

an objective lens for focusing said laser beams onto said optical disc when said first and second laser beams proceed toward said optical disc via said splitter means; and a light-receiving means for receiving said laser beams reflected from said optical disc to control a focusing and a tracking of said laser beam.

2. An optical pickup device as claimed in claim 1, wherein said optical disc having said two data storing layers is comprised of, sequentially from the bottom side to which said first or second laser beam is incident, a first resin layer of which upper portion functions as a first recording layer, a thin film layer for total reflecting either one of said two laser beams having one wavelength while total transmitting the other laser beam having the other wavelength, a second resin layer of which upper portion functions as the second recording layer and a reflection layer for reflecting said laser beam of the other wavelength.

3. An optical pickup device as claimed in claim 1, wherein said beam splitter means is a cubic prism having a first axis, a second axis and a third axis respectively piercing through respective centers of optional two facing planes of the cube, said first axis being arranged to intersect said optical disc at the right angle at the center of said optical disc, said second axis along which said first and second laser beam sources are arranged to oppose each other by interposing said beam splitter means; and, under the state that said cubic prism is divided into four triangular bar-shaped prisms by two symmetrical diagonal planes perpendicular to a plane formed by said first and second axes to be formed of a first triangular bar prism toward said first laser beam source, a second triangular bar prism toward said second laser beam source, a third triangular bar prism toward said optical disc and a fourth triangular bar prism symmetrical to said third prism, a contacting plane of said first and fourth prisms is formed of a first coating layer, a contacting plane of said second and third prisms is a second coating layer, a contacting plane of said third and first prisms is a third coating layer and a contacting plane of said fourth and second prisms is a fourth coating layer, wherein said coating layers are coated in such a manner that said first coating layer partially reflects and partially transmits said first laser beam while totally transmitting said second laser beam, said second coating layer totally reflects said first laser beam and totally transmits said second laser beam, said third coating layer totally transmits said first laser beam and totally reflects said second laser beam, and fourth coating layer totally transmits said first laser beam while partially reflecting and partially transmitting said second laser beam, whereby the first and second laser beams are focused in a state that a half section of the beams are cut through the coating layers, so that tracking and focusing servos can be carried out based upon conditions of the focused half beam spot.

4. An optical pickup device as claimed in claim 3, wherein said optical disc having said two data storing layers is comprised of, sequentially from the bottom side to which said first or second laser beam is incident, a first resin layer of which upper portion functions also first recording layer, a thin film layer for total reflecting either one of said two laser beams having one wavelength while total transmitting the other laser beam having the other wavelength, a second resin layer of which upper portion functions as the second recording layer and a reflection layer for reflecting said laser beam of the other wavelength.

5. An optical pickup device as claimed in claim 1, wherein the optical pickup device comprises first and second collimator lenses respectively installed between said first and second laser beam sources and beam splitter means so that said first and second laser beams are incident to said beam splitter means by being converted into parallel rays.

6. An optical pickup device as claimed in claim 3, wherein said optical disc, beam splitter means and light-receiving means are arranged along one straight line to permit the laser beam received into said light-receiving means to be incident to said light-receiving means via said beam splitter means.

7. An optical pickup device as claimed in claim 3, wherein said light-receiving means is a two division photodetector.

8. An optical pickup device comprising:

first and second laser beam sources for generating first and second laser beams having different wavelengths from each other for recording/reproducing information on/from an optical disc;

beam splitter means arranged along an optical path of said beams from said first and second laser beam sources for selectively transmitting or reflecting said first and second laser beams based upon the positions of said beams to focus said laser beams on said optical disc, and selectively focusing said beams reflected from said optical disc onto light-receiving means, said beam splitter means being a cubic prism having a first axis, a second axis and a third axis respectively piercing through respective centers of optional two facing planes of the cube, said first axis being arranged to intersect said optical disc at the right angle at the center of said optical disc, said second axis along which said first and second laser beam sources are arranged to oppose each other by interposing said beam splitter means; and, under the state that said cubic prism is divided into four triangular bar-shaped prisms by two symmetrical diagonal planes perpendicular to a plane formed by said first and second axes to be formed of a first triangular bar prism toward said first laser beam source, a second triangular bar prism toward said second laser beam source, a third triangular bar prism toward said optical disc and a fourth triangular bar prism symmetrical to said third prism, a contacting plane of said first and fourth prisms is formed of a first coating layer, a contacting plane of said second and third prisms is a second coating layer, a contacting plane of said third and first prisms is a third coating layer and a contacting plane of said fourth and second prisms is a fourth coating layer, wherein said coating layers are coated in such a manner that said first coating layer partially reflects and partially transmits said first laser beam while totally transmitting said second laser beam, said second coating layer totally reflects said first laser beam and totally transmits said second laser beam, said third coating layer totally transmits said first laser beam and totally reflects said second laser beam, and fourth coating layer totally transmits said first laser beam while partially reflecting and partially transmitting said second laser beam, an objective lens for focusing said laser beams onto said optical disc when said first and second laser beams proceed toward said optical disc via said splitter means; and a light-receiving means for receiving said laser beams reflected from said optical disc to control a focusing and a tracking of said laser beams, whereby the first and second laser beams are focused in a state that a half section of the beams are cut through the coating layers, so that tracking and focusing servos can be carried out based upon conditions of the focused half beam spot.

* * * * *